United States Patent [19]

Schoubye

[11] 4,348,373

[45] Sep. 7, 1982

[54] PROCESS FOR THE PREPARATION OF SULFURIC ACID

[75] Inventor: Peter C. S. Schoubye, Hørsholm, Denmark

[73] Assignee: Haldor Topsoe A/S, Lyngby, Denmark

[21] Appl. No.: 243,097

[22] Filed: Mar. 12, 1981

[30] Foreign Application Priority Data

Mar. 25, 1980 [DK] Denmark .................. 1282/80

[51] Int. Cl.³ .......................................... C01B 17/88
[52] U.S. Cl. .......................................... 423/522; 55/73
[58] Field of Search ................ 423/522, 529, 532–538; 55/73

[56] References Cited

U.S. PATENT DOCUMENTS 2,793,935 5/1957 Haltmeier et al. .................. 423/522
3,374,061 3/1968 Topsoe et al. ...................... 423/522

FOREIGN PATENT DOCUMENTS 1395561 3/1965 France ............................. 423/522

OTHER PUBLICATIONS

Schoubye, "Sulphuric acid production from lean H₂S containing gases", Sulphur, Jul.–Aug. 1978.
"High-grade sulphuric acid from moist sulphureous gases", Sulphur, No. 123, Mar./Apr. 1976, pp. 36–42.

Primary Examiner—Earl C. Thomas
Attorney, Agent, or Firm—Lawrence Rosen

[57] ABSTRACT

The invention relates to a process for preparing concentrated sulfuric acid by conducting a gas stream containing $SO_3$ and $H_2SO_4$-vapor in a sulfuric acid tower in countercurrent to liquid sulfuric acid formed through a concentrating zone containing filler bodies trickled with sulfuric acid and an absorption zone where sulfuric acid vapor is absorbed in recycled sulfuric acid on filler bodies trickled therewith. A very substantial reduction in the amount of acid mist formed in conventional processes of this type is obtained by maintaining such temperature conditions in the tower that the recycle acid is withdrawn from the tower at a temperature $T_4$ determined by the formula $$T_4 > 140 + 6\alpha + \beta + 0.2(T_1 - T_d)$$

where $\alpha$ is the concentration of $SO_3 + H_2SO_4$ vapor in the inlet gas to the tower, $\beta$ the concentration of water vapor in the same inlet gas, $T_1$ the temperature in °C. of the same inlet gas and $T_d$ the dew point of the sulfuric acid vapor in the same inlet gas. The filters to catch acid mist may be smaller and they will only cause a very small pressure drop. The dimensions of the tower may be diminished to produce the same amount of concentrated sulfuric acid.

4 Claims, 3 Drawing Figures

PROCESS FOR THE PREPARATION OF SULFURIC ACID

FIELD OF THE INVENTION

The present invention relates to a process for the preparation of sulfuric acid, comprising the steps of passing, in a sulfuric acid tower, a gas stream containing sulfur trioxide and sulfuric acid vapour in a total amount of up to 10% by volume and water vapour in an amount of up to 50% by volume in countercurrent with formed liquid sulfuric acid through a concentrating zone containing filler bodies trickled with sulfuric acid and subsequently an absorption zone wherein sulfuric acid vapour is absorbed in recycled sulfuric acid on filler bodies trickled therewith.

TECHNICAL BACKGROUND OF THE INVENTION

In the classical contact method sulfuric acid is prepared by the oxidation of sulfur dioxide in a dry gas stream, typically having a $SO_2$-content of 4–12% and a ratio $O_2:SO_2$ of 1:1–1.5:1, to sulfur trioxide over a catalyst, preferably a vanadium catalyst.

In the dry gas sulfuric acid process it is important that the sulfur dioxide-containing gas before its conversion to sulfur trioxide has a low content of water vapour, preferably below 100 mg $H_2O/Nm^3$, because water vapour and $SO_3$ in the gas phase at temperatures below about 250° C. react almost quantitatively to form sulfuric acid vapour. This is condensed out in the $SO_3$ absorption tower as a sulfuric acid mist which has to be removed by the aid of a highly efficient gas filter before the exit gas can be emitted to the atmosphere.

This needful drying of the feed gas is a substantial drawback, especially when it contains below 4% of $SO_2$ because the drying takes place using the acid produced as drying agent. The content in the gas of dust or sulfuric acid in the form of droplets must be removed by scrubbing with water and one often seeks to reduce high contents of water in the gas by cooling to below the dew point before the gas is dried. The gas to be dried by the aid of the produced acid will therefore generally be saturated with water vapour at a pressure near atmospheric and a temperature in the range of 35°–50° C., depending on the temperature of the cooling water, which corresponds to 5.6–12% $H_2O$ in the gas at atmospheric pressure. The drying process cannot be carried out with sufficient efficiency if the concentration of sulfuric acid in the drying acid becomes below 92%, corresponding to a mol proportion $H_2O:SO_2$ in the entire feed gas of 1.5:1, which again means that, e.g., a feed gas containing 4% $SO_2$ must be cooled to below 36° C. in order to enable the gas to be dried sufficiently.

Another substantial drawback in the dry gas process is the considerable loss of heat to the cooling with water and reheating to the temperature of 400°–450° C. needed to convert $SO_2$ into $SO_3$, which corresponds to a cooling of the gas of about 150° C. This involves that at a content of $SO_2$ in the feed gas below about 4% there must be supplied heat from an external source to maintain the plant in operation, with the consequent expenses for fuel and costs of the needed heat exchangers.

These drawbacks have resulted in the development of socalled wet gas methods for preparing sulfuric acid, particularly for use for feed gases having a lower content of $SO_2$ than 4–6%, whereby it is possible to treat the gas at the content of water vapour it has from the source, without the need of first cooling and drying it.

Various embodiments of such wet gas methods are known but a common and substantial drawback in them is that large amounts of acid mist are formed in the discharge gas from the plant; this acid mist must not be emitted to the atmosphere and therefore has to be removed by the aid of large filters causing high losses of pressure. Moreover the produced acid usually has a significantly lower concentration than the 93% $H_2SO_4$ which is normally desired for commercial sulfuric acid.

It is the object of the invention to remedy these drawbacks in a wet gas sulfuric acid process of the kind stated, and this is achieved by a temperature regulation.

BRIEF DESCRIPTION OF THE DRAWINGS

A detailed understanding of this requires a somewhat more detailed consideration of prior art, which therefore will be explained in the following, partly with reference to the drawing. In this

Figure 1:
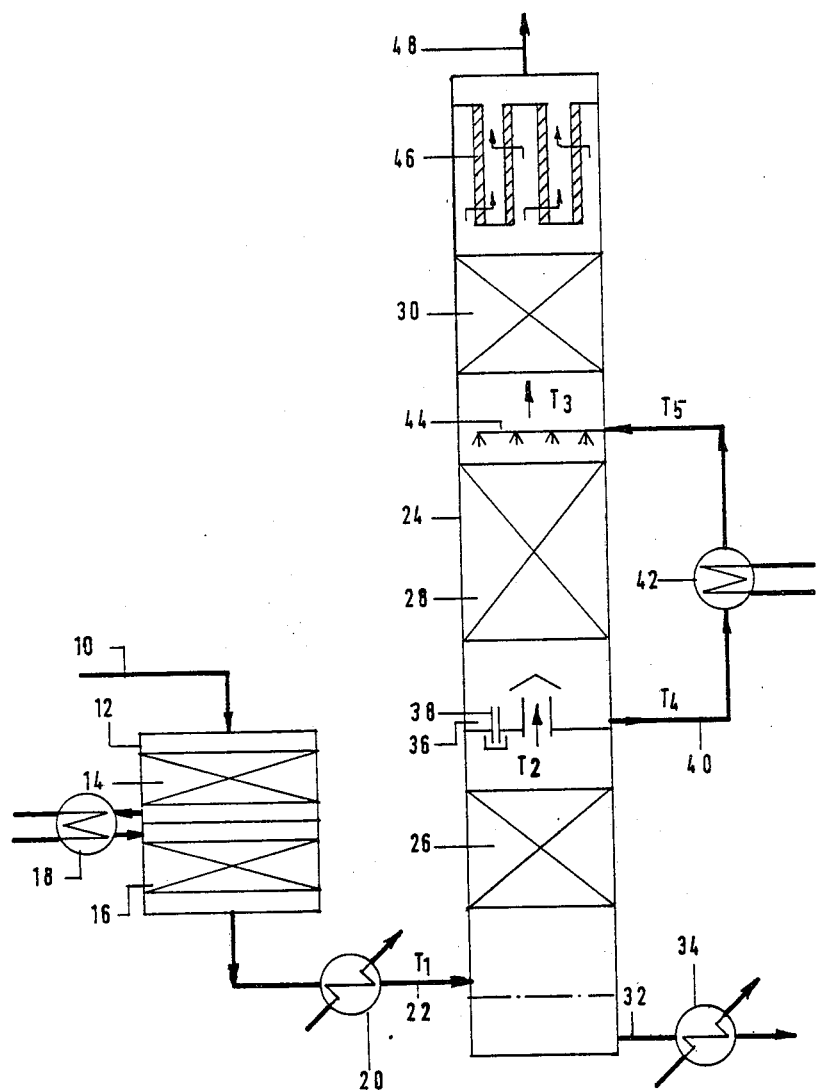
FIG. 1 is a schematic representation of a wet gas sulfuric acid plant for use in a known process, FIG. 2 in the same scale a corresponding plant, altered for carrying out the present process, and FIG. 3 a pilot plant in which some experiments, to be discussed later in the present specification, have been carried out.
Figure 2:
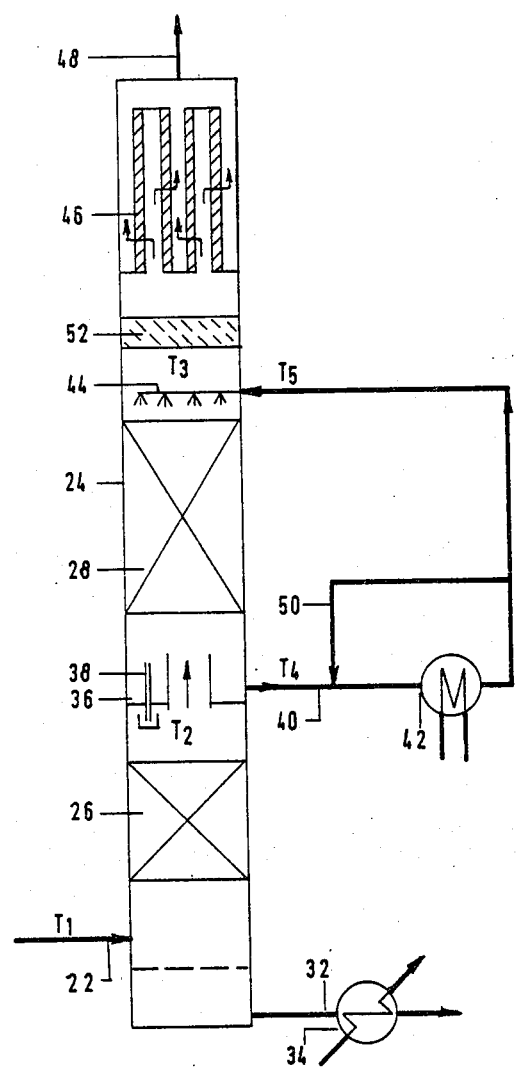
Figure 3:
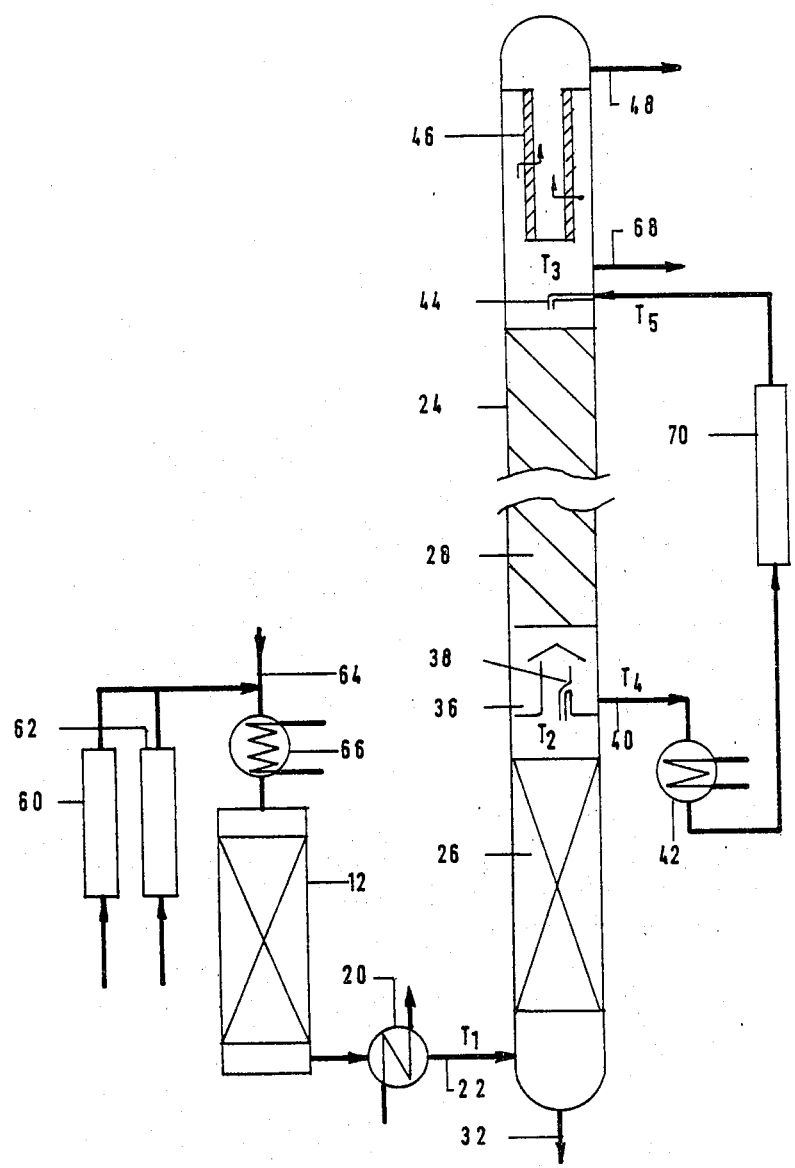

Similarly numbered apparatus elements in FIGS. 1, 2, and 3 have similar functions.

PRIOR ART

It is common to the processes here explained that the wet $SO_2$-containing gas is heated at 400°–450° C. after which $SO_2$ is oxidized to $SO_3$ over one or more layers of catalyst, usually vanadium catalyst, with cooling between the layers.

The $SO_3$- and $H_2O$-containing gas formed may thereafter, e.g. by the aid of a steam boiler, be cooled at a temperature of about 300° C., which is safely above the dew point of the sulfuric acid vapour and accordingly does not involve risk of a condensation of sulfuric acid before its separation from the gas, a condensation which would destroy the heat exchanger. The condensation proper of $SO_3/H_2O$ to liquid sulfuric acid in the original development of the wet gas process took place at 50°–80° C., later at a somewhat higher temperature.

Thus it is known (Sulphur No. 123, March–April 1976, pp. 36–42) to quench the about 300° C. hot, water vapour-containing $SO_3$ gas to below 100° C. by the aid of cold sulfuric acid in a cooling tower with trickling acid or in a Venturi scrubber. Sulfuric acid is condensed partly to liquid acid which is taken off as product at a concentration of 70–85% $H_2SO_4$, partly in the form of an acid mist which is removed by the aid of one or more highly efficient filters. From the said publication it is known to perform partial condensation of the acid vapour in a Venturi scrubber at 180°–230° C. before final condensation in a packed tower wherein sulfuric acid is trickling.

In a variant (P. Schoubye, Sulphur, July–August 1978; French Pat. No. 1,395,561) of this process the preferably dilute sulfuric acid condensed in the trickle tower and caught in the filter and separated is upgraded to 93–96% $H_2SO_4$ by contact in a concentrator, in practice in a concentrating zone in the tower, in countercurrent with the about 300° C. hot $SO_3$-containing feed gas. The practical accomplishment of this embodiment of the wet gas sulfuric acid process is best illustrated by reference to FIG. 1.

In this 10 is a line for feed gas containing sulfur dioxide; the feed gas typically contains less than 6% $SO_2$ and also contains oxygen and water vapour. The $SO_2$ of the feed gas is oxidized to $SO_3$ in a converter 12 which typically contains two catalyst layers 14 and 16 with intermediate cooling in a boiler 18. The oxidation takes place at a temperature of 400°–450° C. The exit gas, now containing $SO_3$, is cooled in a boiler 20 to a temperature $T_1$ which must be safely above the dew point of the gas and typically is about 300° C. before it is conducted via a line 22 as inlet gas into a lined sulfuric acid tower 24. The gas is passed through this in upwards direction and substantially it consists of three zones, lowermost a concentrating zone or concentrator 26, above this an absorption zone or absorber 28 and uppermost an agglomeration zone 30.

In the concentrating zone 26 there is a filling of acid-resistant filler bodies which are trickled with condensed sulfuric acid. Upwards flowing inlet gas from conduit 22 here comes into contact with the liquid which is thereby upgraded to a concentration of 93–98% $H_2SO_4$; sulfuric acid formed and upgraded is taken out from the lower part of the tower via a line 32 and is cooled in a heat exchanger 34.

Between the concentrating zone 26 and the absorption zone 28 there is a vessel 36 for liquid sulfuric acid and having an internal overflow 38. After having passed the concentrator the gas has been cooled to a temperature of typically about 240° C. and is now saturated with sulfuric acid vapour. In the absorption zone 28 there is also a filling of acid-resistant filler bodies which are trickled with liquid sulfuric acid having a temperature $T_5$ of typically about 100° C., which causes the upwards flowing gas to be cooled to about 120° C., whereby almost all of the sulfuric acid vapour is condensed and absorbed in the trickling acid or passed upwards into a filter 46 in the form of acid mist. As already mentioned the condensed acid flows downwards through the overflow tube and it represents the net production of the plant. Part of the condensed acid, however, is present as very small droplets which in the form of an acid mist is passed further upwards in the tower with the upward flowing gas.

The trickling acid is obtained by recycling acid from vessel 36 and having a temperature $T_4$, typically about 140° C., via a line 40 and an acid cooler 42 to tower 24 to trickle in absorption zone 28. When re-entering the tower it typically has a concentration of 85–88% $H_2SO_4$ and trickles downwards over the filling in absorption zone 28 from openings in a liquid distributor 44.

The fine droplets of the acid mist are agglomerated in part into larger drops in a filling of acid-resistant filler bodies in the agglomeration zone and from this they can trickle downwards as liquid sulfuric acid through zones 28 and 26. Remaining amounts of droplets must be caught in a highly efficient filter 46 before the gas, now substantially freed of sulfuric acid and sulfur dioxide, may be led away into the atmosphere via a stack 48.

It has been found, however, that in wet gas sulfuric acid plants, including those of the type shown in FIG. 1, there is formed in practice large amounts of acid mist and that the agglomeration into larger drops in agglomeration zone 30 is not very complete; despite the agglomeration zone a very large and efficient filter 46 is therefore needed, and when catching a large amount of acid mist this causes a considerable drop of pressure with consequent considerable energy consumption to operate compressors (not shown).

It is the object of the invention to provide a process in which the amount of acid mist is reduced and the sulfuric acid produced has the desired concentration of at least 93% $H_2SO_4$.

FINDINGS RESULTING IN THE INVENTION

In preparatory experiments it was surprisingly found in practice that at low concentration of sulfuric trioxide in the gas admitted into the tower, i.e. below 0.5 or 1% $SO_3$ it was possible to obtain a reasonably mist-free operation if the exit temperature $T_4$ of the recycle acid was the highest permissible for the plant, i.e. 140°–150° C. and the inlet temperature $T_1$ of the inlet gas to the tower at the same time was at most about 280° C. At a $SO_3$-content in the gas admitted into the tower of above 1–2% there was formed large amounts of acid mist which had a tendency to flood the filter and render operation of the plant impossible; and moreover the emission limit of 50 mg acid mist per $Nm^3$, was exceeded because the gas frequently contains more than 10 g of acid mist per $Nm^3$ and the filter only removes 99% of the acid mist. Even by the installation of very large filters one could not expect to be able to comply with an emission limit of 50 or only 40 mg acid mist per $Nm^3$ because the content of acid mist in the gas frequently exceeded 10–20 $g/Nm^3$ whereas the degree of purification even in the best filters hardly is over 99.5%.

Based on these findings pilot experiments were carried out as explained later in this specification. In the experiments it was surprisingly found that the formation of acid mist depends on four operational parameters mentioned below, and that emission of sulfuric acid in the form of vapour as well as in the form of mist could be almost completely avoided without the use of mist filters by the proper combination of said four parameters, to wit:

(1) The temperature $T_4$ of the recycle acid leaving the tower via line 40 and after cooling returning to the tower as trickling acid via distributor 44. When this temperature is above a certain critical value, depending upon the three other factors mentioned below, the acid mist disappears almost completely.

(2) The concentration of $SO_3$ plus $H_2SO_4$-vapour in the inlet gas into the tower, in the following denoted $P_{SO_3,i}$; the higher this concentration, the higher the tendency to mist. In connection with this also the concentration of water vapour in the inlet gas has a certain significance.

(3) The temperature $T_1$ of the inlet gas into the tower. In order to avoid corrosion in the heat exchanger upstream of the tower, $T_1$ must be at least 30° above and preferably at least 40° C. above the sulfuric acid dew point of the gas, for which reason the difference between the dew point and $T_1$ rather than $T_1$ itself partakes in the determination of $T_4$.

(4) The temperature $T_5$ of the trickling acid and the proportion of the amount of inlet gas and trickling acid, L:G expressed as kg/h trickling acid per $Nm^3/h$ inlet gas. Calculation of the heat balance for the tower shows, however, that $T_5$ and L:G are interdependent and determined by $T_4$ when $T_1$ and the composition of the inlet gas are known.

It was found by the experiments that the higher $P_{SO_3,i}$ and the higher $T_1$, the higher $T_4$ must be in order to avoid formation of acid mist. It was also found that the tendency to form acid mist decreased, in other words that the critical value of $T_4$ decreased with decreased acid recycle down to a certain limit; below this it was not possible to cool the gas sufficiently to avoid emission of vaporous sulfuric acid. This occurs when the temperature of the exit gas is above 120°–130° C.

BRIEF DESCRIPTION OF THE INVENTION

On the basis of the above it has been found that even without the use of a highly efficient filter it is possible to obtain a discharge gas from a wet gas sulfuric acid plant which is substantially free of sulfuric acid vapour and acid mist, if according to the invention the sulfuric acid tower is operated under such temperature conditions that the recycle acid leaves the tower at a temperature $T_4°$ C., determined by the formula $$T_4 > 140 + 6\alpha + \beta + 0.2(T_1 - T_d)$$

$\alpha$ being the concentration in % by volume of $SO_3 + H_2SO_4-$ vapour in the inlet gas entering the tower, $\beta$ the concentration in % by volume of water vapour in the same inlet gas, $T_1$ the temperature of the same inlet gas expressed in °C. and $T_d$ the dew point of the sulfuric acid vapour in the same inlet gas expressed in °C. ($T_1 - T_d$ being at least 10). The formula is reasonably valid in the concentration range of 0.2–10% ($SO_3 + H_2SO_4$ vapour) interesting in practice, and for concentrations of water vapour up to about 30% $H_2O$.

DETAILED EXPLANATION OF THE INVENTION

In defining the invention it has been assumed that the key parameter for forming acid mist or not is the exit temperature $T_4$ of the recycle acid. The real key parameter, however, seems to be both the temperature $T_2$ of the gas flowing upwards from the concentrating zone and $T_4$. However, as $T_2$ is a comparatively constant temperature at the practical operation of the plant, it is a permissible simpflication to consider $T_4$ as the decisive parameter.

It may be mentioned that $T_2 - T_4$ at a concentration of 0.5–1% $SO_3$ in the inlet gas must be below about 100° C., at 3% $SO_3$ in the inlet gas below about 70° C., and at 5–6% $SO_3$ in the inlet gas below about 40° C. in order to ensure that there is less than 50 mg of $H_2SO_4$ per $Nm^3$ in the exit gas before the filter. This is probably because too big a temperature difference between the trickled filler bodies and the gas cause so big under-cooling of the $H_2SO_4$ vapour in the lowermost part of the absorption zone that the acid condenses in the gaseous phase as an aerosol instead of diffusing out into the liquid film on the filler bodies.

This mechanism in the mist formation also explains why a too big over-temperature of the inlet gas gives increased tendency to mist formation, or in other words requires increase of $T_4$, since indeed this over-temperature causes sulfuric acid to evaporate in the concentrating zone so that the concentration of $H_2SO_4$-vapour in the lower parts of the absorption zone is increased. It is observed, however, that this explanation is not exhaustive and that the results observed are difficult to explain fully as the conditions in the absorption zone are complicated by the fact that uppermost in this zone an absorption of water vapour from the gaseous phase of the trickling acid occurs, which may give the latter a temperature increase of up to 40°–80° C.

In the pilot experiments it was also found that the operational conditions in the concentrating zone have a great practical importance. If the acid flowing down into concentrating zone 26 via overflow 38 is not at least as hot as the acid outflow from the absorption zone and hence the recycle acid, then the mist formation is significantly increased at the spot where the down-flowing acid meets the hot gas in the concentrating zone, and this acid mist passes almost unreduced through the absorption zone to the filter. According to the invention one therefore should let sulfuric acid flow to the concentrating zone at at least the temperature at which the recycle acid is taken out of the tower. In practice this can be achieved by suitable heat insulation of the tower and by constructing the tower with interior overflow through which the acid produced flows down into the concentrator, which is built together with the absorber part; hereby there cannot occur any cooling of the acid as there might when the overflow tube is placed externally on the tower or concentrator and absorber are separated.

It was found in the pilot experiments that without the concentrating zone it is practically impossible to avoid the formation of large amounts of acid mist, whereas it is not necessary to have this zone in order to achieve the desired concentration of at least 93% $H_2SO_4$. If the 280°–300° C. hot inlet gas thus is passed directly to the absorption zone, the exit acid from this will have a concentration of about 93% $H_2SO_4$ at an exit temperature of 180°–200° C. Product acid accordingly might be drawn directly off from the recycle acid loop without using the overflow 38 and the concentrating zone. Surprisingly it was found, however, that the concentrating zone is needed for an entirely different reason than that described in the prior art, viz. to avoid acid mist.

A fourth important observation was that the tendency to form acid mist seems to decrease somewhat at increasing size of the filler bodies. Thus, at the pilot experiments there was noticed a greater tendency to mist formation when using 10 mm saddles instead of 20 mm saddles in the absorption zone; and in an industrial plant, where 50 mm saddles were employed, it is found after alteration of the plant in accordance with the process of the invention that the necessary temperature $T_4$ at 5–6% ($SO_3 + H_2SO_4$) in the inlet gas is 10°–20° C. lower than that observed in the pilot experiments. Accordingly one therefore conveniently uses filler bodies of nominal size of 50 mm or more.

In the said experiments it has been found, as will be seen in Table 2 hereinafter, that the temperature $T_5$ of the trickling acid is important for the formation of acid mist so that a lower temperature of this acid decreases the amount of acid mist. The temperature $T_3$ of the gas from the absorption zone in part is a function of the temperature $T_5$ of the trickling acid; the latter is heated by the contact with the upwards flowing gases above the absorption zone 28. When the abovementioned requirements regarding the temperature at which the recycle acid is withdrawn from the tower are fulfilled, the amount of acid mist can be kept very small if according to the invention the recycled acid is admitted into the tower above the absorption zone at a temperature $T_5$ of 30°–60° C., whereas it typically is about 100° C. in the prior art illustrated in FIG. 1.

The circumstance that the temperature increase $T_5 - T_4$ of the trickling acid during passage through the absorption zone is increased from 20°–40° C. to 100°–150° C. in the process of the invention involves that the stream of trickling acid becomes about 4 times less in the present process than in prior art, whereby the diameter of the tower may be reduced.

The operational alterations caused by the process according to the invention and alterations of the described wet gas plant thereby necessitated in practice will be apparent from FIG. 2, showing only the tower.

The diameter of tower 24 may be reduced because of the considerably smaller liquid loading. The filler bodies in concentrating zone 26 and absorption zone 28, which in the prior art embodiment typically have a size of 20–25 mm, as mentioned may be replaced by somewhat larger filler bodies, especially with a nominal size of 50 mm or a little more, whereby the flow resistance and accordingly the pressure drop is reduced.

To protect acid cooler 42 against the higher temperature $T_4$ of the recycle acid leaving the tower, there is put in an extra bypass 50, in which cooler 42 is placed, in the conduit system comprising line 40, conveying the recycle acid via the cooler back to liquid distributor 44. The temperature in the recycle system after cooler 42 is expediently maintained at the aforementioned 30°–60° C., e.g. at about 50° C.

Furthermore the capacity of acid cooler 42 is increased because the acid for the reason stated must be cooled at a lower temperature than hitherto.

The filling in agglomeration zone 30 may be replaced by a simple demister 52. However, filter 46 is retained in principle to prevent escape of acid mist at the start of the plant and interruptions of operation. It may possibly be smaller than usually. Since under normal operation it collects practically no acid mist, it will only cause a small drop in pressure. By using the process explained in an industrial plant, one has obtained stable operation with a content of acid mist in the discharge gas of a few mg per Nm³ when using filters that are comparatively cheap in investment and operation.

The thickness of the lining and heat insulation materials around the absorption zone 28 and the part of the tower between the absorption zone and concentrating zone 26 is increased because of the higher temperature in the absorption zone and the higher temperature $T_4$.

Finally, the process of the invention is to be illustrated further by description of the aforementioned experiments and a pilot plant used for them.

EXPERIMENTS

In the experiments there was used the pilot plant schematically shown in FIG. 3. Gas from an industrial ore roasting plant and containing 0.5–1% $SO_2$ and carbon dioxide, nitrogen, argon and steam is conducted in an amount of 20–35 Nm³/h via a flowmeter 60 and a gas heater 66 into converter 12 in which about 98% of the $SO_2$-content is oxidized to $SO_3$ In some experiments a higher concentration of $SO_2$ was used and additional amounts thereof may be added via another flowmeter 62, and extra water vapour via a line 64. After cooling to the desired temperature $T_1$ in heat exchanger 20 the gas as in the prior art is conducted to the lower part of a vertical sulfuric acid tower 24.

Tower 24 is constructed of glass tubes having an inner diameter of 100 mm and insulated with 15–20 cm thick mineral wool whereby the loss of heat until the temperature measuring point $T_3$ at the return of the recycle acid to the tower was less than corresponding to a temperature drop of 10° C. As filler bodies both in concentrating zone 26, which had a height of 0.6 m, and in absorbing zone 26, which had a height of 1.5 m, there was used 20 mm ceramic saddle-shaped bodies.

Temperatures were measured with thermo elements in thermo wells having diameter 3 mm.

Gas samples to determine the content of acid mist were taken from a line 68; the acid mist was filtered off in a glass wool filter and its amount determined by titration.

As in the industrial plants described the pilot plant between the concentrating zone and the absorption zone had a vessel 36 with overflow 38, and acid at temperature $T_4$ was recycled via line 40, cooler 42, flowmeter 70 and trickle inlet 44 to tower 24 above the absorber. Gas left the tower via filter 46 and stack 48.

Typical measured results are shown in Tables 1 and 2 below. The measurement results shown are average values measured over periods of 4–6 hours of constant operational conditions. Within such a measuring period the acid mist values measured could vary from 50% to 200% of the average value whereas the temperatures were maintained at the stated temperature ±4° C.

The experiments resulting in the figures shown in Table 1 were conducted at constant temperature of acid recycled to the tower of $T_5 = 35°$ C. The discharge temperature of the gas in line 68 and stack 48 was 70°–90° C. and the gas flow through the tower was about 26 Nm³/h per m² tower cross section. The acid recycle rate through line 40, cooler 42 and flowmeter 70 to trickle inlet 44 was about about 15–25 l/h and adjusted to obtain the desired value of $T_4$. The uncertainty factor on the determination of the content of acid mist before the filter as mentioned was 0.5–2.

TABLE 1

| Inlet gas in conduit 22 | | $T_d$, | $T_1$, | $T_2$, | $T_4$, | $T_2-T_4$ | Content of acid mist before filter, g $H_2SO_4$/ |
|---|---|---|---|---|---|---|---|
| % $SO_3$ | % $H_2O$ | °C. | °C. | °C. | °C. | °C. | Nm³ |
| 0.6–1 | 10 | 228 | 280 | 230 | 100 | 130 | 10 |
| 0.6–1 | 10 | 228 | 280 | 230 | 130 | 100 | 2 |
| 0.6–1 | 10 | 228 | 280 | 230 | 150 | 80 | 0.04 |
| 3 | 10 | 235 | 290 | 240 | 130 | 110 | >10 |
| 3 | 10 | 235 | 290 | 240 | 150 | 90 | 2 |
| 3 | 10 | 235 | 290 | 240 | 180 | 60 | 0.04 |
| 3 | 20 | 245 | 300 | 250 | 190 | 60 | 0.04 |
| 3 | 5 | 235 | 280 | 240 | 180 | 60 | 0.03 |
| 5–6 | 10 | 245 | 300 | 250 | 150 | 100 | >10 |
| 5–6 | 10 | 245 | 300 | 250 | 180 | 70 | 1 |
| 5–6 | 10 | 245 | 300 | 250 | 190 | 60 | 0.2 |
| 5–6 | 10 | 245 | 300 | 250 | 200 | 50 | 0.04 |
| 5–6 | 10 | 245 | 330 | 250 | 200 | 50 | 0.3 |

As will be clear from what has been said earlier and the drawing, $T_d$ is the dew point of the sulfuric acid vapour in the inlet gas in line 22, $T_1$ the temperature of that inlet gas, $T_2$ the temperature of the gas passing from the concentrator upwards into absorber 28 and $T_4$ the temperature of the sulfuric acid in recycle line 40, leaving the absorption part.

Table 1 shows that with an inlet temperature to the tower of 35° C. of the recycled acid there may be obtained such high absorption of sulfuric acid vapour in the recycle acid and possibly already in the concentrating zone that there is at most 40 mg of acid mist per m³ of discharge gas, if the exit temperature ($T_4$) of the recycle acid is maintained above about 150° C. when the inlet gas contains 0.6–1% $SO_3$, above about 180° C. when it contains 3% $SO_3$, and above about 200° C. when it contains 5–6% $SO_3$, the temperature of the inlet gas being safely above the dew point, at least about 30° C. above it. On the other hand, as mentioned hereinbefore, the inlet gas must not have too high a temperature without simultaneous increase of $T_4$, since this, as will be seen from Table 1, will result in a tendency to increased formation of acid mist. It is seen that the content of water in the inlet gas has a small influence on the critical value for the exit temperature of the recycle gas.

Table 2 shows results of a series of experiments in which the stream L and the inlet temperature $T_5$ of the trickle acid was varied while the inlet stream G in line 22 was maintained constant at 22 Nm$^3$/h and the temperature $T_1$ of this maintained constant at 280° C.; the content of $SO_3$ was 3% and of water vapour 10%, the dew point accordingly 235° C.

The higher measured amount of acid mist before the filter by measurements in the order stated can hardly be explained solely by the higher sulfuric acid vapour pressue, which at $T_3 = 130°$ C. and 6-7% remaining water vapour before the filter is about 40 mg $H_2SO_4$ per Nm$^3$. It is probable that low values of L/G in themselves decrease the tendency to acid mist formation because low values of L/G mean that the heat capacity of the two streams approach one another which again according to the general theory of heat exchange between two streams causes the temperature profile in the lower, critical part of the absorber to become less steep, and consequently that the condensation of sulfuric acid vapour occurs more slowly.

TABLE 2

| $T_5$, °C. | l acid pr. hour in line 44 | $T_4$, °C. | $T_3$, °C. | Content of acid mist before filter, mg $H_2SO_4$/Nm$^3$ |
|---|---|---|---|---|
| 35 | 14 | 180 | 80 | 30 |
| 60 | 16 | 180 | 90 | 40 |
| 120 | 24 | 180 | 130 | 200 |

I claim:

1. In a process for preparing sulfuric acid, comprising the steps of passing, in a sulfuric acid tower, a gas stream containing sulfur trioxide and sulfuric acid vapour in a total amount of up to 10% by volume and water vapour in an amount of up to 50% by volume in countercurrent with formed liquid sulfuric acid through a concentrating zone containing filler bodies trickled with sulfuric acid and subsequently an absorption zone wherein sulfuric acid vapour is absorbed in recycled sulfuric acid on filler bodies trickled therewith, the improvement consisting in maintaining in the sulfuric acid tower such temperature conditions that the recycle acid is removed from the tower at a temperature of $T_4$°C., determined by the formula $$T_4 > 140 + 6\alpha + \beta + 0.2(T_1 - T_d)$$

where $\alpha$ is the concentration in % by volume of $SO_3 + H_2SO_4$-vapour in the inlet gas entering the tower, $\beta$ the concentration in % by volume of water vapour in the same inlet gas, $T_1$ the temperature of the same inlet gas in °C. and $T_d$ the dew point of the sulfuric acid vapour in the same inlet gas in °C.

2. The process as claimed in claim 1, wherein sulfuric acid is allowed to flow to the concentrating zone at at least the temperature at which the recycle acid is discharged from the tower.

3. A process as claimed in claim 1 or claim 2, wherein the recycled acid is admitted into the tower at a temperature of 30°-60° C.

4. A process as claimed in claim 1 or claim 2, wherein the filler bodies employed in the absorption zone have a nominal size of 50 mm or more.

* * * * *